(12) United States Patent
Shen et al.

(10) Patent No.: US 11,003,235 B2
(45) Date of Patent: May 11, 2021

(54) METHOD AND COMPUTER PROGRAM PRODUCT AND APPARATUS FOR ADJUSTING OPERATING FREQUENCIES

(71) Applicant: Silicon Motion, Inc., Zhubei (TW)

(72) Inventors: Chang-Wei Shen, Taoyuan (TW); Te-Kai Wang, New Taipei (TW); Pin-Hua Chen, Hsinchu County (TW)

(73) Assignee: SILICON MOTION, INC., Zhubei (TW)

( * ) Notice: Subject to any disclaimer, the term of this patent is extended or adjusted under 35 U.S.C. 154(b) by 113 days.

(21) Appl. No.: 16/264,137

(22) Filed: Jan. 31, 2019

(65) Prior Publication Data

US 2020/0064898 A1 Feb. 27, 2020

(30) Foreign Application Priority Data

Aug. 21, 2018 (CN) .......................... 201810953834.2

(51) Int. Cl.
*G06F 1/324* (2019.01)
*G06F 1/3234* (2019.01)
*G06F 1/3225* (2019.01)
*G06F 1/08* (2006.01)
*G06F 1/3206* (2019.01)
*G06F 3/06* (2006.01)

(52) U.S. Cl.
CPC ................ *G06F 1/324* (2013.01); *G06F 1/08* (2013.01); *G06F 1/3225* (2013.01); *G06F 1/3275* (2013.01); *G06F 1/325* (2013.01); *G06F 1/3206* (2013.01); *G06F 3/0625* (2013.01)

(58) Field of Classification Search
CPC ...... G06F 1/3206; G06F 1/324; G06F 1/3275; G06F 1/3225; G06F 3/0625; G06F 1/325; G06F 1/08
USPC .................................................. 713/320, 322
See application file for complete search history.

(56) References Cited

U.S. PATENT DOCUMENTS 9,372,790 B2 6/2016 Lee et al.
10,592,126 B2 3/2020 Lee et al.
(Continued)

FOREIGN PATENT DOCUMENTS

CN 102193747 A 9/2011
CN 104811257 A 7/2015
(Continued)

OTHER PUBLICATIONS

English translation of the Taiwanese Search Report for Taiwanese Application No. 107129113, dated Oct. 29, 2019.
(Continued)

*Primary Examiner* — Ji H Bae
(74) *Attorney, Agent, or Firm* — Birch, Stewart, Kolasch & Birch, LLP

(57) ABSTRACT

The invention introduces a non-transitory computer program product for adjusting operating frequencies when executed by a processing unit of a device, containing program code to: collect an interface-activity parameter comprising information about data transmissions on a host access interface and/or a flash access interface; select one from multiple frequencies according to the interface-activity parameter; and drive a clock generator to output a clock signal at the selected frequency, thereby enabling the host access interface and/or the flash access interface to operate at an operating frequency.

15 Claims, 5 Drawing Sheets

(56) References Cited

U.S. PATENT DOCUMENTS

| | | | |
|---|---|---|---|
| 2005/0091425 A1* | 4/2005 | Wyatt | G06F 1/3275 |
| | | | 710/33 |
| 2006/0174146 A1* | 8/2006 | Prosperi | G06F 1/3203 |
| | | | 713/320 |
| 2011/0264845 A1 | 10/2011 | Choi | |
| 2014/0163716 A1* | 6/2014 | Chang | G06F 1/26 |
| | | | 700/117 |
| 2015/0084675 A1 | 3/2015 | Kim et al. | |
| 2016/0077572 A1 | 3/2016 | Chang | |
| 2016/0154449 A1* | 6/2016 | Lim | G06F 1/3296 |
| | | | 713/322 |
| 2016/0155494 A1 | 6/2016 | Kim | |
| 2016/0179175 A1 | 6/2016 | Nasrullah et al. | |
| 2018/0225236 A1* | 8/2018 | Suzuki | G06F 3/0629 |
| 2019/0058474 A1* | 2/2019 | Tzafrir | H03K 19/00384 |

FOREIGN PATENT DOCUMENTS

| | | |
|---|---|---|
| CN | 105653005 A | 6/2016 |
| CN | 107766006 A | 3/2018 |
| TW | 105654988 A | 6/2016 |

OTHER PUBLICATIONS

Chinese Search Report dated Sep. 24, 2020 for Application No. 201610953834.2.

\* cited by examiner

METHOD AND COMPUTER PROGRAM PRODUCT AND APPARATUS FOR ADJUSTING OPERATING FREQUENCIES

CROSS-REFERENCE TO RELATED APPLICATIONS

This application claims the benefit of priority to Patent Application No. 201810953834.2, filed in China on Aug. 21, 2018; the entirety of which is incorporated herein by reference for all purposes.

BACKGROUND

The disclosure generally relates to flash memory and, more particularly, to method and computer program product and apparatus for adjusting operating frequencies.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. Actually, NAND flash devices usually read or program several pages of data from or into memory cells. In reality, the NAND flash device always reads from the memory cells and writes to the memory cells complete pages. After a page of data is read from the array into a buffer inside the device, the host can access the data bytes or words one by one by serially clocking them out using a strobe signal.

Power-consumption saving is always an important topic. Conventionally, the host controls the flash device to operate in one of sleep modes to reduce battery power-consumption when no data access is performed. The flash device selectively activates or deactivates the whole or a portion of circuits therein according to the advised sleep mode to achieve the purpose. However, such control mechanism does not apply to an active mode in which data is transferred between the host and the flash device. Thus, it is desirable to have an apparatus, a method and a computer program product for adjusting operating frequencies in the active mode to yield better battery power-consumption.

SUMMARY

In an aspect of the invention, a non-transitory computer program product is introduced for adjusting operating frequencies when executed by a processing unit of a device, containing program code to: collect an interface-activity parameter comprising information about data transmissions on a host access interface and/or a flash access interface; select one from multiple frequencies according to the interface-activity parameter; and drive a clock generator to output a clock signal at the selected frequency.

In another aspect of the invention, a method for adjusting operating frequencies, performed by a processing unit of a device when loading and executing software or firmware program code, is introduced to contain steps for: collecting an interface-activity parameter comprising information about data transmissions on a host access interface and/or a flash access interface; selecting one from multiple frequencies according to the interface-activity parameter; and driving a clock generator to output a clock signal at the selected frequency.

In further aspect of the invention, an apparatus for adjusting operating frequencies is introduced to have a clock generator and a processing unit coupled thereof. The processing unit is arranged to operably collect an interface-activity parameter comprising information about data transmissions on a host access interface and/or a flash access interface; select one from multiple frequencies according to the interface-activity parameter; and drive a clock generator to output a clock signal at the selected frequency.

As a result, the host access interface and/or the flash access interface can operate at an expected operating frequency.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
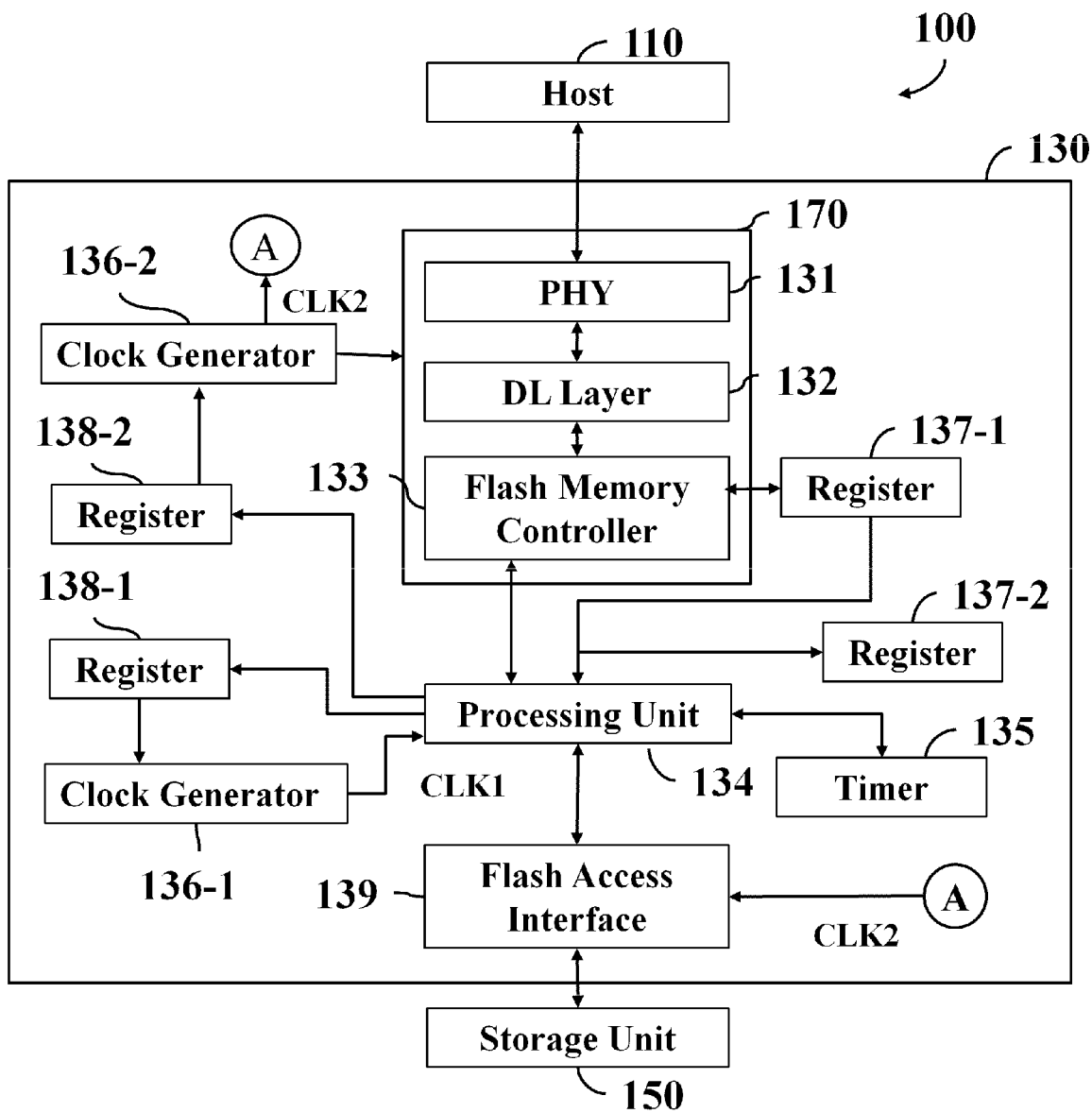
FIG. 1 is the system architecture of a flash memory according to an embodiment of the invention.

Refer to FIG. 1. The system architecture of a flash memory may include a host 110, a device 130 and a storage unit 150. The system architecture may be practiced in a personal computer (PC), a laptop PC, a tablet computer, a mobile phone, a digital camera, a digital recorder, or other electronic consumer products. The host 110 may communicate with the device 130 through a flash memory protocol, such as Universal Flash Storage (UFS). A flash memory controller 133 is electrically connected (coupled) to the host 110 through a data link (DL) layer 132 and a physical layer (PHY) 131. The flash memory controller 133 may read user data of the storage unit 150 from a data buffer (no shown in FIG. 1) by a direct memory access (DMA) controller (no shown in FIG. 1) and serially clock the user data out to the host 110 through the DL layer 132 and the PHY 131. The flash memory controller 133 may write user data to be programmed into the data buffer by a DMA controller (no shown in FIG. 1). A processing unit 134 may be implemented in numerous ways, such as with general-purpose hardware that is programmed when loading and executing relevant software or firmware instructions to perform the functions recited herein, such as a single-core processor, a multi-core processor with parallel computation capability, a Graphical Processing Unit (GPU), a lightweight general-purpose processor, or others. The flash memory controller 133 may be a UFS controller to communicate with the host in UFS protocol. Although embodiments of the invention describe UFS as an exemplary communications protocol, those artisans may apply the invention to some other communications protocols, such as Universal Serial Bus (USB), Advanced Technology Attachment (ATA), Serial Advanced Technology Attachment (SATA), Peripheral Component Interconnect Express (PCI-E), etc.

The device 130 may further include a flash access interface 139 to thereby enable the processing unit 134 to communication with the storage unit 150, specifically, using a Double Data Rate (DDR) protocol, such as Open NAND Flash Interface (ONFI), DDR toggle, or others. The processing unit 134 writes user data into a designated address (a destination address) of the storage unit 150 and reads user data from a designated address (a source address) thereof through the flash access interface 139. The flash access interface 139 may use several electronic signals including a data line, a clock signal line and control signal lines for coordinating command and data transfer between the processing unit 134 and the storage unit 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
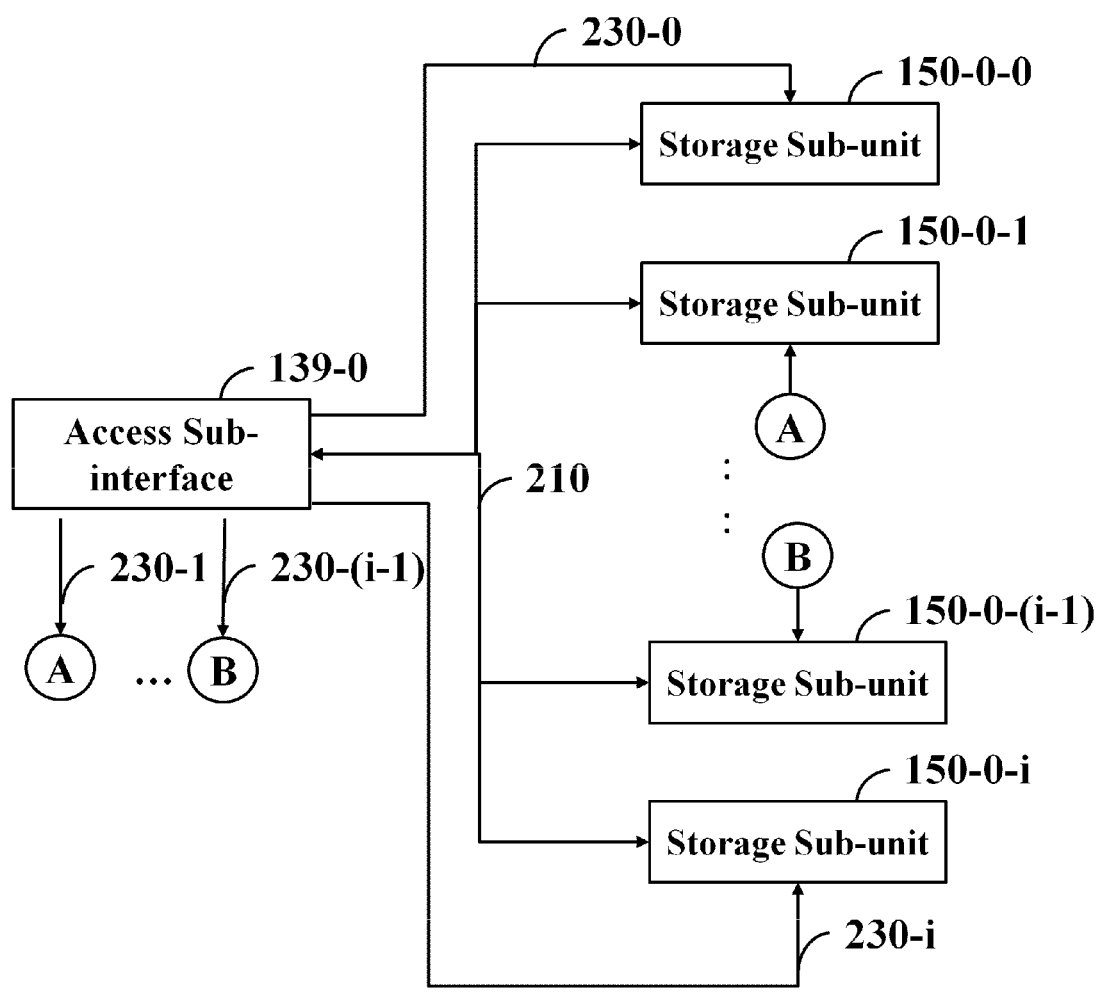
FIG. 2 is a schematic diagram depicting connections between one access sub-interface and multiple storage sub-units according to an embodiment of the invention.

The storage unit 150 may contain multiple storage sub-units and each storage sub-unit may use a respective access sub-interface to communicate with the processing unit 134. One or more storage sub-units may be packaged in a single die. The flash access interface 139 may contain j access sub-interfaces and each access sub-interface may connect to i storage sub-units. Each access sub-interface and the connected storage sub-units behind may be referred to as a I/O channel collectively and identified by a Logical Unit Number (LUN). That is, i storage sub-units may share the same access sub-interface. For example, assume that the storage device 130 contains 4 I/O channels and each I/O channel connects to 4 storage sub-units: The storage device 130 may access 16 storage sub-units. The processing unit 134 may drive one of the access sub-interfaces to read data from the designated storage sub-unit. Each storage sub-unit has an independent CE control signal. That is, it is required to enable a corresponding CE control signal when attempting to perform data read or programming from or into a designated storage sub-unit via an associated access sib-interface. It is apparent that any number of I/O channels may be provided in the storage device 130, and each I/O channel may include any number of storage sub-units, and the invention should not be limited thereto. Refer to FIG. 2. The processing unit 134, through the access sub-interface 139-0, may use independent CE control signals 230-0-0 to 230-0-i to select one of the connected storage sub-units 150-0-0 to 150-0-i, and then read data from or program data into the designated location of the selected storage sub-unit via the shared data line 210.

Refer to FIG. 1. The device 130 further include a clock generator 136-1. The clock generator 136-1 is a circuit for generating a clock signal CLK1 and outputting the clock signal CLK1 to the processing unit 134 for use in synchronizing fetches, decodes, executions and write-backs of firmware instructions, macrocode, microcode, or others. In some embodiments, when expecting that the storage unit 150 will not be accessed for a long time, the host 110 may issue a command to instruct the device 130 to enter a power-saving mode. For example, the host 110 may send a primitive DME_HIBERNATE_ENTER for entering a sleep mode to the device 130. The flash controller 133 after receiving the primitive DME_HIBERNATE_ENTER may disable the clock generator 136-1 to reduce battery power-consumption. Or, the host 110 may send a Start Stop Unit (SSU) command to force the device 130 to enter a sleep state. The flash controller 133 after receiving the SSU command may gate the clock signal CLK1 generated by the clock generator 136-1 to prevent the clock signal CLK1 from being provided to the processing unit 134. The references of the data formats and issuance details of the primitive DME_HIBERNATE_ENTER and the SSU command may be made to the JEDEC JESD220C standard, UFS version 2.1, published in March 2016. The battery power consumption can be reduced when the processing unit 134 is not driven by the clock signal CLK1. It is to be understood that the processing unit 134 that is not driven by the clock signal CLK1 cannot execute any firmware or software instruction, macrocode or microcode. However, in an active mode, no control mechanism can be employed by the host 110 to reduce battery power-consumption of the device 130.

To address the limitations, embodiments of the invention introduce power-saving mechanism in an active mode to make the device 130 actively adjust one or more clock signals that are provided to a processing unit and/or an access interface according to data transmission statuses between the device 130 and the host 110 and/or the device 130 and the storage unit 150. For example, a clock generator may be controlled to generate a clock signal with a lower frequency to reduce battery power-consumption when a lower data rate is required between two devices.

Refer to FIG. 1. The device 130 may further include a clock generator 136-2. The clock generator 136-2 is a circuit for generating a clock signal CLK2 and outputting the clock signal CLK2 to a UFS InterConnect (UIC) Layer 170 including the PHY 131, the DL layer 132 and the flash controller 133, and the flash access interface 139 for use in synchronizing data transmissions, or others. The UIC layer 170 may be referred to as a host access interface. The clock generators 136-1 and 136-2 adjust the frequencies of the output clock signals CLK1 and CLK2 according to the settings of the registers 138-2 and 138-2, respectively.

Figure 3:
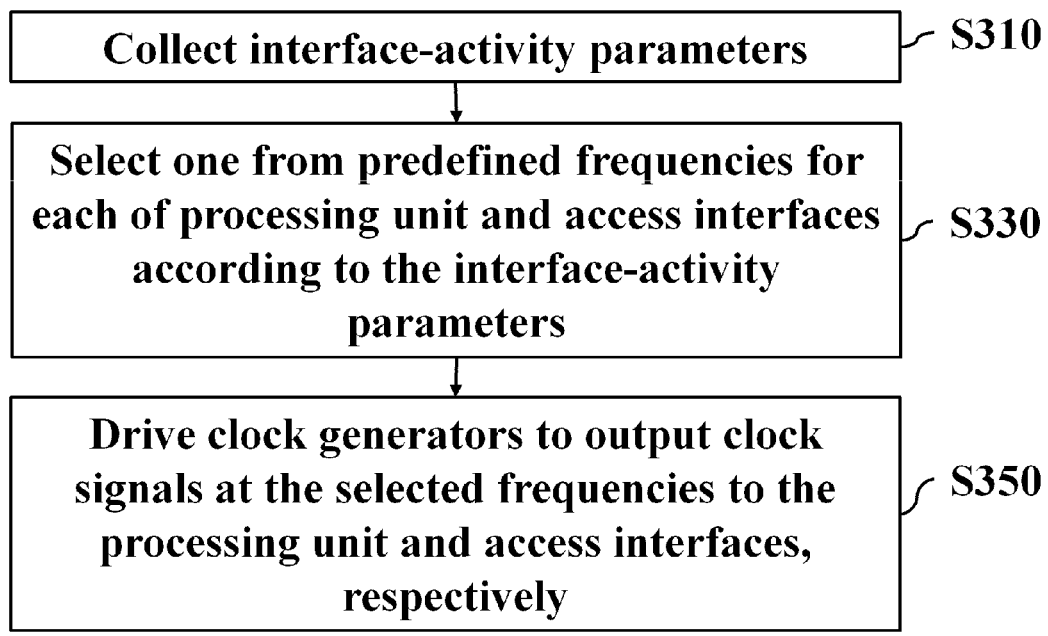
FIG. 3 is a flowchart illustrating a method for adjusting operating frequencies according to an embodiment of the invention.

To provide better power-saving capacity, the device 130 may predefine multiple frequencies for the processing unit 134 and the flash access interface 139, respectively. For example, frequencies of the clock signal CLK1 output to the processing unit 134 may be set to 500, 250, 125 MHz, or others, and frequencies of the clock signal CLK2 output to the access interfaces (including the UIC layer 170 and the flash access interface 139) may be set to 300, 150, 75 MHz, or others. Refer to FIG. 3. The method illustrated in FIG. 3 may be performed when the processing unit 134 loads and executes relevant firmware or software instructions, macrocode, microcode or others. The processing unit 134 may collect interface-activity parameters including information about data transmissions on the UIC layer 170 and/or the flash access interface 139 (step S310). For example, the interface-activity parameter may indicate whether the device 130 has entered an idle state, the flash access interface 139 has been employed to perform a background operation, the current data transmission mode of the UIC layer 170, or others. The processing unit 134 selects one from the predefined frequencies for each of the processing unit 134 and the access interfaces according to the interface-activity parameters (step S330), drives the clock generator 136-1 to output the clock signal CLK1 at the selected frequency to the processing unit 134 and drives the clock generator 136-2 to output the clock signal CLK2 at the selected frequency to the access interfaces, thereby enabling the processing unit 134, the UIC layer 170 and the flash access interface 139 to operate at designated operating frequencies, respectively (step S350). In some embodiments of step S350, the processing unit 134 may adjust the frequency of the clock signal CLK2 output from the clock generator 136-2 only and maintain a higher frequency level of the clock signal CLK1 output from the clock generator 136-1.

Figure 4:
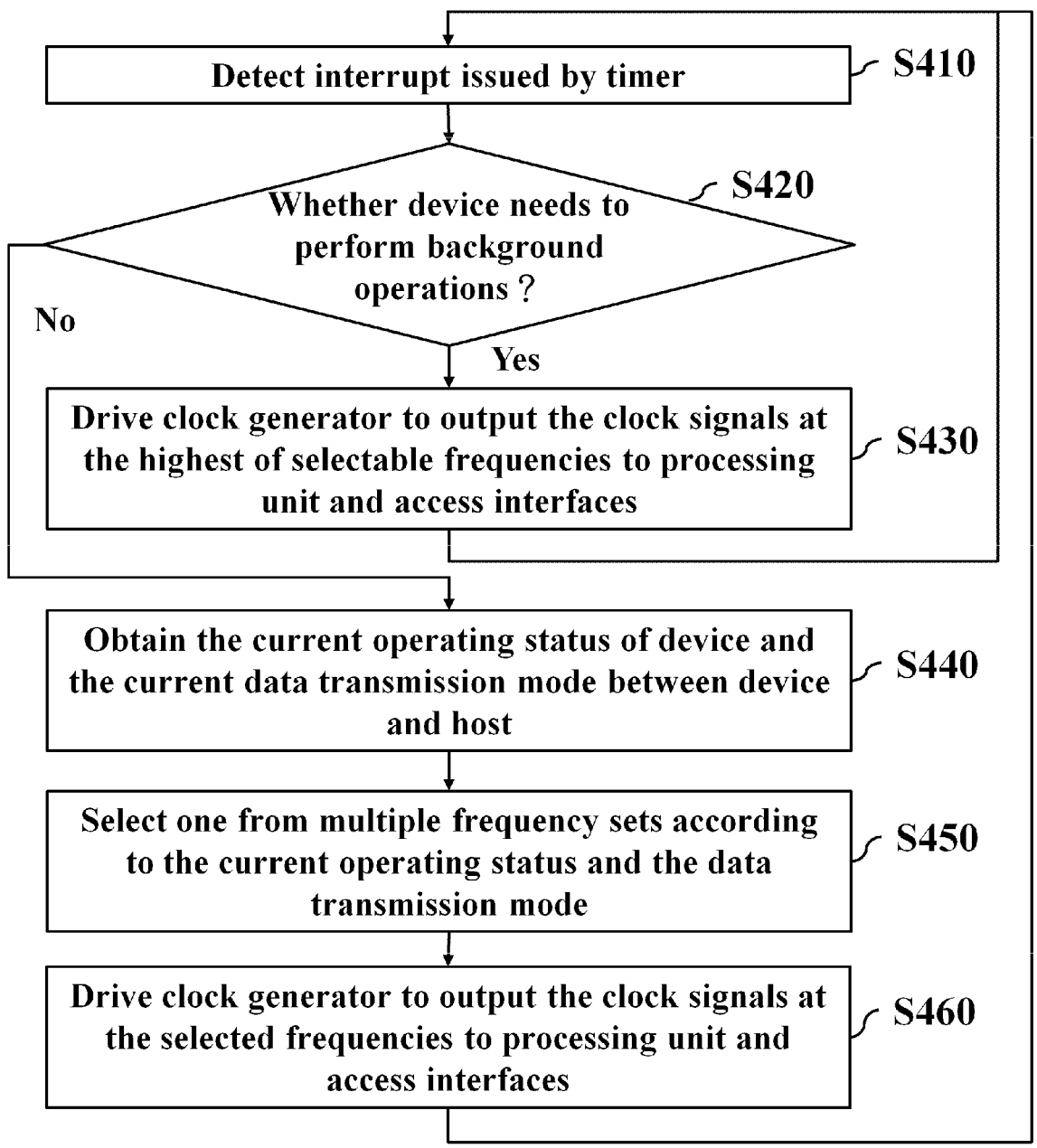
FIG. 4 is a flowchart illustrating a method for periodically adjusting clock signals output from a clock generator according to an embodiment of the invention.

Refer to FIG. 4. The method illustrated in FIG. 4 may be performed when the processing unit 134 loads and executes relevant firmware or software instructions, macrocode, microcode or others. The processing unit 134 may periodically execute a loop (steps S410 to S460) and, in each iteration, collect interface-activity parameters, determine frequencies of the clock signals CLK1 and CLK2 output from the clock signal generators 136-1 and 136-2, respectively, according to the interface-activity parameters, and drive the clock signal generators 136-1 and 136-2 to output the clock signals CLK1 and CLK2 at the determined frequencies.

The device 130 further include a timer 135. The processing unit 134 may reset the timer 135 to start or restart a counting for a predetermined time period, such as 2, 3, 5 milliseconds (ms), etc. during a system initiation or after each iteration. When counting to the predetermined time, the timer 135 issues an interrupt to the processing unit 134 for triggering a new iteration of an operating frequency adjustment (step S410).

In some embodiments, the frequencies CLK1 and CLK2 may be adjusted to one of three levels according to the collected interface-activity parameters. Exemplary frequency ranges may be listed in Table 1:

TABLE 1

| | Frequency range of CLK1 | Frequency range of CLK2 |
|---|---|---|
| LV3 | 400~600 MHz | 250~350 MHz |
| LV2 | 200~300 MHz | 125~175 MHz |
| LV1 | 100~150 MHz | 62.5~87.5 MHz |

When determining that the device 130 needs to be operated at a high speed the processing unit 134 may drive the clock generator 136-1 to output the clock signal CLK1 at a frequency ranging from 400 to 600 MHz and the clock generator 136-2 to output the clock signal CLK2 at a frequency ranging from 250 MHz to 350 MHz. When determining that the device 130 needs to be operated at a moderate speed the processing unit 134 may drive the clock generator 136-1 to output the clock signal CLK1 at a frequency ranging from 200 MHz to 300 MHz and the clock generator 136-2 to output the clock signal CLK2 at a frequency ranging from 125 MHz to 175 MHz. When determining that the device 130 needs to be operated at a low speed the processing unit 134 may drive the clock generator 136-1 to output the clock signal CLK1 at a frequency ranging from 100 MHz to 150 MHz and the clock generator 136-2 to output the clock signal CLK2 at a frequency ranging from 62.5 MHz to 87.5 MHz. The manufacturer of the device 130 may store the predefined frequencies of the three levels of the clock signals CLK1 and CLK2 in a nonvolatile memory (no shown in FIG. 1) before the device 130 is left from the factory, thereby enabling the processing unit 134 to accordingly perform operating-frequency adjustment.

When detecting an interrupt issued by the timer 135 the processing unit 134 may firstly determine whether the device 130 needs to perform background operations (step S420). One bit of a register 137-2 may be used to store information whether the device 130 needs to perform background operations. For example, values "1" and "0" indicate a need and no need of background operations, respectively. The processing unit 134 may read a value of the register 137-2 to determine whether the device 130 needs that. The background operations are data accesses that are not originated (or triggered) by the host 110 but the device 130, for example, a garbage collection (GC), a wear leveling, a read reclaim or a read reflash process, etc.

For example, after numerous accesses, a physical page may include valid and invalid sectors (also referred to as stale sectors), in which the valid sectors store valid user data while the invalid sectors store invalid (expired) user data. When detecting that available space of the storage unit 150 is insufficient, the processing unit 134 may set the register 137-2 (referred to as a background-operation register) to indicate that the device 130 needs to perform background operations (e.g. a GC process). In a GC process, the processing unit 134 drives the flash access interface 139 to reprogram the collected valid user data into an empty physical page of a spare or active block, thereby making the data block storing expired user data be able to erase to become a spare block. The data block after being erased may provide space for storing new user data.

For example, after certain times of erases (for example, 500, 1000, 5000 times, or more), a physical block of the storage unit 150 may be considered as a bad block that is no longer be used because of poor data retention. To longer the service life of physical blocks, the processing unit 134 may continuously monitor erase times for each physical block. When erase times of one data block exceed an erase threshold, the processing unit 134 may set the register 137-2 to indicate that the device 130 needs to perform background operations (e.g. a wear leveling process). In a wear leveling process, the processing unit 134 selects one spare block with minimum erase times as a destination block and drive the flash access interface 139 to program the read user data into available physical pages of the selected destination block.

Moreover, when a condition for triggering a read reclaim or a read reflash process has been met, the processing unit 134 may set the register 137-2 to indicate that the device 130 needs to perform background operations (e.g. a read reclaim or a read reflash process).

Since a background operation needs to execute a series of commands to read data from the storage unit 150 and program data into the storage unit 150, the processing unit 134, the flash access interface 139 and the storage unit 150 may be operated as fast as possible. When determining that the device 130 needs to perform background operations (the "Yes" path of step S420), the processing unit 134 drives the clock generator 136-1 to output the clock signal CLK1 at the highest of selectable frequencies to the processing unit 134 and the clock generator 136-2 to output the clock signal CLK2 at the highest of selectable frequencies to the UIC layer 170 and the flash access interface 139, enabling the processing unit 134, the UIC layer 170 and the flash access interface 139 to operate at the highest operating frequency (step S430). For example, the processing unit 134 may set a value of a register 138-1 to become the third level (LV3) of CLK1 as shown in Table 1 (that is, a frequency ranging from 400 MHz to 600 MHz), thereby enabling the clock generator 136-1 to output the clock signal CLK1 at a frequency corresponding to the set value to the processing unit 134; and set a value of a register 138-2 to become the third level (LV3) of CLK2 as shown in Table 1 (that is, a frequency ranging from 250 MHz to 350 MHz), thereby enabling the clock generator 136-2 to output the clock signal CLK2 at a frequency corresponding to the set value to the UIC 170 and the flash access interface 139. It would be realized that, during the background operations, executions of data access commands issued by the host 110 can be interleaved by the processing unit 134.

For a situation that is no need to perform background operations, the processing unit 134 may make itself, the flash access interface 139 and the storage unit 150 operate at operating frequencies compatible with a data transmission mode between the device 130 and the host 110. When determining that the device 130 does not need to perform a background operation (the "No" path of step S420), the processing unit 134 obtains the current operating status of the device 130 and the current data transmission mode between the device 130 and the host 110 (step S440).

The UFS interface may operate at Pulse-Width Modulation (PWM) and high-speed (HS) gears. The PWM gear may be 0.5 Gbps or lower while the HS gear may be 1.4 Gbps or higher. The PWM gear may be referred to as a low speed gear. For example, the data rates of different HS-GEARs defined in the UFS specification are listed in Table 2:

TABLE 2

| RATE A-series (Mbps) | RATE B-series (Mbps) | HS-GEARs |
| --- | --- | --- |
| 1248 | 1457.6 | HS-G1 (A/B) |
| 2496 | 2915.2 | HS-G2 (A/B) |
| 4992 | 5830.4 | HS-G3 (A/B) |

The rate A of HS-G1 gear is 1248 Mbps (megabits per second), the rate B of HS-G1 gear is 1457.6 Mbps, the rate A of HS-G2 gear is 2496 Mbps, the rate B of HS-G2 gear is 2915.2 Mbps, the rate A of HS-G3 gear is 4992 Mbps and the rate B of HS-G3 gear is 5830.4 Mbps. The data rates of different PWM-GEARs defined in the UFS specification are listed in Table 3:

TABLE 3

| PWM-GEARs | Min. (Mbps) | Max. (Mbps) |
| --- | --- | --- |
| PWM-G0 | 0.01 | 3 |
| PWM-G1 | 3 | 9 |
| PWM-G2 | 6 | 18 |
| PWM-G3 | 12 | 36 |
| PWM-G4 | 24 | 72 |
| PWM-G5 | 48 | 144 |
| PWM-G6 | 96 | 288 |
| PWM-G7 | 192 | 576 |

The data rate of PWM-G0 gear is ranging from 0.01 Mbps to 3 Mbps, the data rate of PWM-G1 is ranging from 3 Mbps to 9 Mbps, the data rate of PWM-G2 is ranging from 6 Mbps to 18 Mbps, and the rest can be deduced according to Table 3.

The device 130 may be equipped with a register 137-1 for storing a data transmission mode between the device 130 and the host 110. The register 137-1 may store a value of five bits, two of which (referred to as a mode register) indicates a transmission mode and the other three bits (referred to as a gear register) indicates a gear. For example, the mode register stores a value "0b00", "0b01", "0b10" or "0b11" to indicate that the UFS interface is operated at a PWM mode, a PWM-auto mode, a HS mode or a HS-auto mode. The gear register stores a value ranging from "0b000" to "0b111" to indicate a corresponding one of the gears 0 to 7. The host 110 may issue a mode change command to the device 130 for configuring a data transmission mode between the device 130 and the host 110. When receiving the mode change command, the flash memory controller 133 sets the mode and gear registers accordingly. Exemplary settings of the mode and gear registers for different data transmission modes are described in Table 4:

TABLE 4

| Data Transmission Mode | Mode Register | Gear Register |
| --- | --- | --- |
| PWM (PWM-auto)-G0 | 0b00 (0b01) | 0b000 |
| PWM (PWM-auto)-G1 | 0b00 (0b01) | 0b001 |
| PWM (PWM-auto)-G2 | 0b00 (0b01) | 0b010 |
| PWM (PWM-auto)-G3 | 0b00 (0b01) | 0b011 |
| PWM (PWM-auto)-G4 | 0b00 (0b01) | 0b100 |
| PWM (PWM-auto)-G5 | 0b00 (0b01) | 0b101 |
| PWM (PWM-auto)-G6 | 0b00 (0b01) | 0b110 |
| PWM (PWM-auto)-G7 | 0b00 (0b01) | 0b111 |
| HS (HS-auto)-G1 | 0b10 (0b11) | 0b001 |
| HS (HS-auto)-G2 | 0b10 (0b11) | 0b010 |
| HS (HS-auto)-G3 | 0b10 (0b11) | 0b011 |

When the mode change command instructs the device 130 to operate at gear 0 of the PWM mode, the flash memory controller 133 sets the mode and gear registers to "0b00" and "0b000", respectively. When the mode change command instructs the device 130 to operate at gear 0 of the PWM-auto mode, the flash memory controller 133 sets the mode and gear registers to "0b01" and "0b000", respectively. Settings for the rest gears of the PWM and PWM-auto modes may be deduced by analogy and are omitted hereinafter for brevity. When the mode change command instructs the device 130 to operate at gear 1 of the HS mode, the flash memory controller 133 sets the mode and gear registers to "0b10" and "0b001", respectively. When the mode change command instructs the device 130 to operate at gear 1 of the HS-auto mode, the flash memory controller 133 sets the mode and gear registers to "0b11" and "0b001", respectively. Settings for the rest gears of the HS and HS-auto modes may be deduced by analogy and are omitted hereinafter for brevity.

When being operated at the PWM-auto or HS-auto mode, the device 130 enters an idle state automatically to reduce battery consumption by deactivating a portion of circuits thereof when no data has been transceived with the host 110 for a predetermined time period since the last data transmission or reception. The device 130 may further be equipped with a register (no shown in FIG. 1) coupled to the processing unit 134 for storing information whether the device 130 has entered an idle state.

After obtaining the current operating status of the device 130 and the current data transmission mode between the device 130 and the host 110 (step S440), the processing unit 134 selects one from multiple frequency sets accordingly (step S450). Refer to the divisions of frequency levels as shown in Table 1. The processing unit 134 may use the following rules to determine frequencies of clock signals output to the processing unit 134, the flash access interface 139 and the storage unit 150 according to the content of the register 137-1:

(1) selecting frequencies conform to the first level (LV1) when the device 130 has entered an idle state regardless of the current data transmission mode;
(2) selecting frequencies conform to the first level (LV1) when the device 130 has not entered an idle state and the current data transmission mode is the PWM or PWM-auto mode regardless of the gear;
(3) selecting frequencies conform to the second level (LV2) when the device 130 has not entered an idle state and the current data transmission mode is gear 1 of the HS or HS-auto mode; and
(4) selecting frequencies conform to the third level (LV3) when the device 130 has not entered an idle state and the current data transmission mode is gear 2 or 3 of the HS or HS-auto mode.

After selecting one from multiple frequency sets according to the current data transmission mode (step S450), the processing unit 134 drives the clock generator 136-1 to output the clock signal CLK1 at the selected frequency to itself 134 and drives the clock generator 136-2 to output the clock signal CLK2 at the selected frequency to the UIC layer 170 and the flash access interface 139, thereby enabling the processing unit 134, the UIC layer 170 and the flash access interface 139 to operate at designated frequencies (step S460). For example, when the current data transmission mode is gear 1 of the HS or HS-auto mode the processing unit 134 may set a value of the register 138-1 to become the second level (LV2) of CLK1 as shown in Table 1 (that is, a frequency ranging from 200 MHz to 300 MHz), thereby enabling the clock generator 136-1 to output the clock signal CLK1 at a frequency corresponding to the set value to the processing unit 134; and set a value of a register 138-2 to become the second level (LV2) of CLK2 as shown in Table 1 (that is, a frequency ranging from 125 MHz to 175 MHz), thereby enabling the clock generator 136-2 to output the clock signal CLK2 at a frequency corresponding to the set value to the UIC 170 and the flash access interface 139. In some embodiments of step S460, the processing unit 134 may adjust the frequency of the clock signal CLK2 output from the clock generator 136-2 only and maintain an averaged frequency level of the clock signal CLK1 output from the clock generator 136-1.

The interface-activity parameters of step S310 of FIG. 3 may include all or a portion of values of the registers 137-1 and 137-2.

Figure 5:
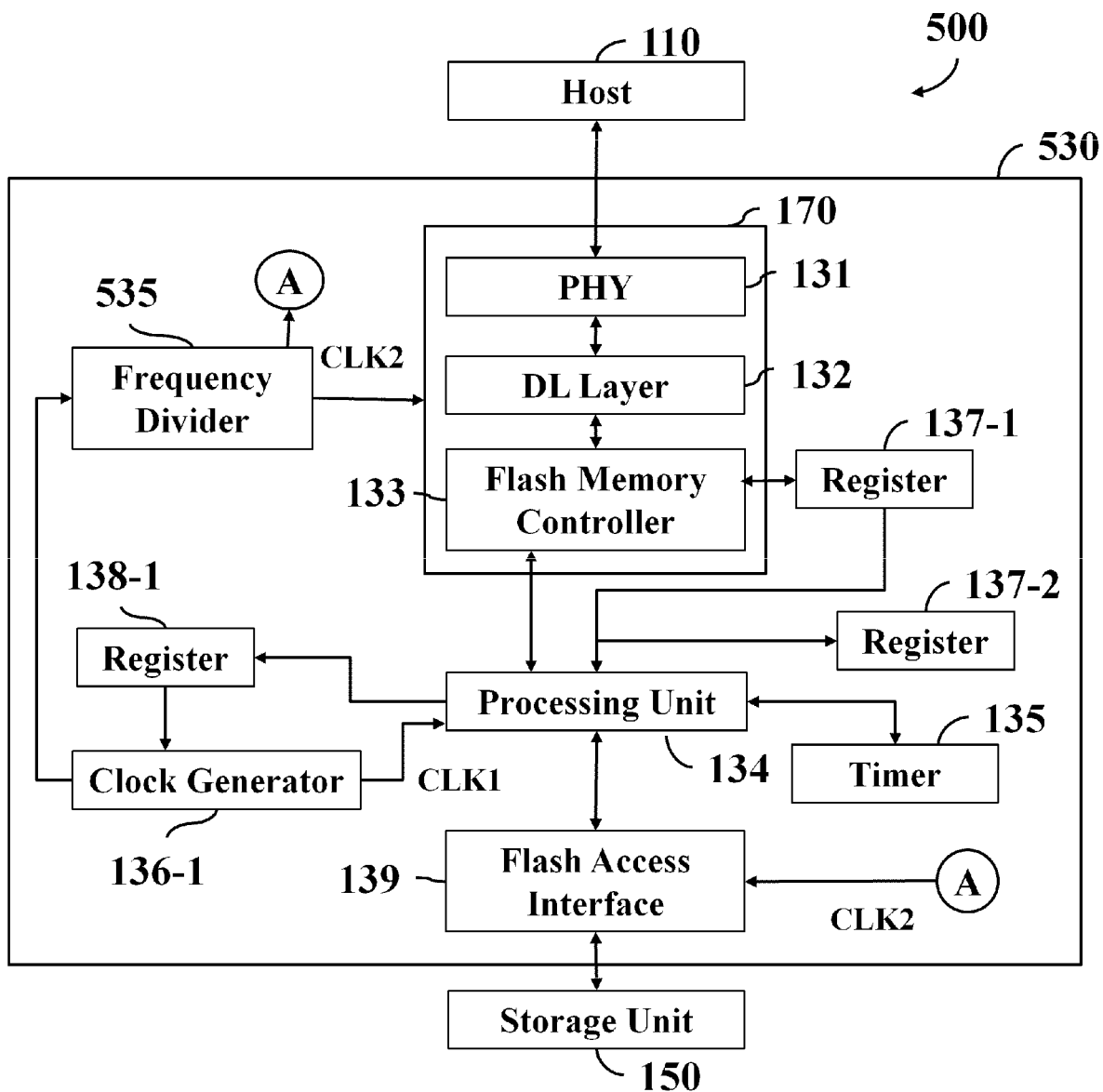
FIG. 5 is the system architecture of a flash memory according to another embodiment of the invention.

The architecture of the device 130 may be modified to make the processing unit 134 control only one signal generator for forcing itself and the access interfaces (including the UIC layer 170 and the flash access interface 139) to operate at different operating frequencies, respectively. Refer to FIG. 5. A modified device 530 may be equipped with a frequency divider 535 coupled between the clock generator 136-1, the UIC layer 170 and the flash access interface 139 for feeding in the clock signal CLK1 at a frequency $f_{in}$ from the clock generator 136-1 and generating and outputting the clock signal CLK2 at a frequency ½, ⅗ or ⅔$f_{in}$ to the UIC layer 170 and the flash access interface 139. Reflecting the modified device 530, step S430 of FIG. 4 may be devised that the processing unit 134 sets a value of the register 138-1 to become the third level (LV3) of CLK1 as shown in Table 1 (that is, a frequency ranging from 400 MHz to 600 MHz) to drive the clock generator 136-1 to output the clock signal CLK1 at a frequency $f_{in}$ corresponding to the set value to the processing unit 134 and the frequency divider 535, thereby enabling the frequency divider 535 to generate and output the clock signal CLK2 at a frequency ½, ⅗ or ⅔$f_{in}$ to the UIC layer 170 and the flash access interface 139. Moreover, step S460 of FIG. 4 may be devised that the processing unit 134 drives the clock generator 136-1 to output the clock signal CLK1 at the selected frequency $f_{in}$ to the processing unit 134 and the frequency divider 535, thereby enabling the frequency divider 535 to generate and output the clock signal CLK2 at a frequency ½, ⅗ or ⅔$f_{in}$ to the UIC layer 170 and the flash access interface 139.

It is understood that when the processing unit 134 includes a circuit for adapting the clock signal CLK1 the operating frequency of the processing unit 134 may be different from the frequency of the clock signal CLK1. When the host access interface 170 or the flash access interface 139 includes a circuit for adapting the clock signal CLK2 the operating frequency of that may be different from the frequency of the clock signal CLK1. Those artisans realize that a faster frequency of the clock signal CLK1 leads to a faster operating frequency of the processing unit 134, and vice versa. A faster frequency of the clock signal CLK2 leads to faster operating frequencies of the host access interface 170 and the flash access interface 139, and vice versa.

The following passages introduce several use cases to explain how the aforementioned apparatus and method for adjusting operating frequencies work.

In the first use case, assume that the device 130 does not perform background operations: Firstly, the host 110 issues a mode change command to instruct the device 130 to operate at a particular gear of the HS-auto mode. After receiving the mode change command, the flash memory controller 133 sets the register 137-1 to store information about this data transmission mode. Meanwhile, the device 130 enters an active state. Subsequently, the processing unit 134 reads the register 137-1 (step S440), drives the clock generator 136-1 to output the clock signal CLK1 at a corresponding frequency (for example, conform to LV2 or LV3 of CLK1) to the processing unit 134 and drives the clock generator 136-2 to output the clock signal CLK2 at a corresponding frequency (for example, conform to LV2 or LV3 of CLK2) to the access interfaces according to the read data transmission mode, thereby enabling the processing unit 134, the UIC layer 170 and the flash access interface 139 to operate at expected operating frequencies, respectively (steps S450 to S460). Next, suppose that no data has been transceived with the host 110 for a predetermined time period, the device 130 enters an idle state automatically. After detecting that the device 130 has entered an idle state (step S440), the processing unit 134 drives the clock generator 136-1 to output the clock signal CLK1 at a frequency (for example, conform to LV1 of CLK1) to the processing unit 134 and drives the clock generator 136-2 to output the clock signal CLK2 at a frequency (for example, conform to LV1 of CLK2) to the access interfaces, thereby enabling the processing unit 134, the UIC layer 170 and the flash access interface 139 to operate at slower operating frequencies, respectively, for reducing battery power consumption (step S450 to S460).

In the second use case, assume that the device 130 does not perform background operations: Firstly, the host 110 issues a mode change command to instruct the device 130 to operate at a particular gear of the HS-auto mode. After receiving the mode change command, the flash memory controller 133 sets the register 137-1 to store information about this data transmission mode. Subsequently, the processing unit 134 reads the register 137-1 (step S440), drives the clock generator 136-1 to output the clock signal CLK1 at a corresponding frequency (for example, conform to LV2 or LV3 of CLK1) to the processing unit 134 and drives the clock generator 136-2 to output the clock signal CLK2 at a corresponding frequency (for example, conform to LV2 or LV3 of CLK2) to the access interfaces according to the read data transmission mode, thereby enabling the processing unit 134, the UIC layer 170 and the flash access interface 139 to operate at expected operating frequencies, respectively (steps S450 to S460). Next, the host 110 issues a mode change command to instruct the device 130 to operate at a particular gear of the PWM or PWM-auto mode (i.e. a changed data transmission mode). After receiving the mode change command, the flash memory controller 133 sets the register 137-1 to store information about the changed data transmission mode. Subsequently, the processing unit 134 reads the register 137-1 (step S440), drives the clock generator 136-1 to output the clock signal CLK1 at a frequency (for example, conform to LV1 of CLK1) to the processing unit 134 and drives the clock generator 136-2 to output the clock signal CLK2 at a frequency (for example, conform to LV1 of CLK2) to the access interfaces according to the changed data transmission mode, thereby enabling the processing unit 134, the UIC layer 170 and the flash access interface 139 to operate at slower operating frequencies, respectively, for reducing battery power consumption (step S450 to S460).

In a third use case, assume that the device 130 does not perform background operations: Firstly, the host 110 issues a mode change command to instruct the device 130 to operate at gear 2 or 3 of the HS or HS-auto mode. After receiving the mode change command, the flash memory controller 133 sets the register 137-1 to store information about this data transmission mode. Subsequently, the processing unit 134 reads the register 137-1 (step S440), drives the clock generator 136-1 to output the clock signal CLK1 at a corresponding frequency (for example, conform to LV3 of CLK1) to the processing unit 134 and drives the clock generator 136-2 to output the clock signal CLK2 at a corresponding frequency (for example, conform to LV3 of CLK2) to the access interfaces according to the read data transmission mode, thereby enabling the processing unit 134, the UIC layer 170 and the flash access interface 139 to operate at expected operating frequencies, respectively (steps S450 to S460). Next, the host 110 issues a mode change command to instruct the device 130 to operate at gear 1 of the HS or HS-auto mode (i.e. a changed data transmission mode). After receiving the mode change command, the flash memory controller 133 sets the register 137-1 to store information about the changed data transmission mode. Subsequently, the processing unit 134 reads the register 137-1 (step S440), drives the clock generator 136-1 to output the clock signal CLK1 at a frequency (for example, conform to LV2 of CLK1) to the processing unit 134 and drives the clock generator 136-2 to output the clock signal CLK2 at a frequency (for example, conform to LV2 of CLK2) to the access interfaces according to the changed data transmission mode, thereby enabling the processing unit 134, the UIC layer 170 and the flash access interface 139 to operate at slower operating frequencies, respectively, for reducing battery power consumption (step S450 to S460).

Some or all of the aforementioned embodiments of the method of the invention may be implemented in a computer program such as an operating system for a computer, a driver for a dedicated hardware of a computer, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

The computer program may be advantageously stored on computation equipment, such as a computer, a notebook computer, a tablet PC, a mobile phone, a digital camera, a consumer electronic equipment, or others, such that the user of the computation equipment benefits from the aforementioned embodiments of methods implemented by the computer program when running on the computation equipment. Such the computation equipment may be connected to peripheral devices for registering user actions such as a computer mouse, a keyboard, a touch-sensitive screen or pad and so on.

Although the embodiment has been described as having specific elements in FIGS. 1 and 5, it should be noted that additional elements may be included to achieve better performance without departing from the spirit of the invention. Each element of FIGS. 1 and 5 is composed of various circuits and arranged to operably perform the aforementioned operations. While the process flows described in FIGS. 3 and 4 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-transitory computer-readable storage medium for adjusting operating frequencies when executed by a processing unit of a device, the non-transitory computer-readable storage medium comprising program code to:

collect an interface-activity parameter comprising information about data transmissions on a host access interface and/or a flash access interface;

select the maximum of a plurality of first frequencies when the interface-activity parameter indicates that the device needs to perform a background operation; and drive a first clock generator to output a first clock signal at the selected first frequency, thereby enabling the host access interface and/or the flash access interface to operate at a first operating frequency, wherein the background operation is a garbage collection, a wear leveling, a read reclaim or a read reflash process.

2. The non-transitory computer-readable storage medium of claim 1, comprising program code to:

select one from a plurality of second frequencies according to the interface-activity parameter; and drive a second clock generator to output a second clock signal at the selected second frequency, thereby enabling the processing unit to operate at a second operating frequency.

3. The non-transitory computer-readable storage medium of claim 1, wherein the background operation is not originated by a host but the device.

4. The non-transitory computer-readable storage medium of claim 1, comprising program code to:

select the minimum of the first frequencies when the interface-activity parameter indicates that the device has entered an idle state.

5. The non-transitory computer-readable storage medium of claim 1, comprising program code to:

select the minimum of the first frequencies when the interface-activity parameter indicates that the device does not perform the background operation and has not entered an idle state, and a data transmission mode between a host and the device is Pulse-Width Modulation (PWM) or PWM-auto mode.

6. The non-transitory computer-readable storage medium of claim 1, comprising program code to:

select the maximum of the first frequencies when the interface-activity parameter indicates that the device does not perform the background operation and has not entered an idle state, and a data transmission mode between a host and the device is gear 2 or 3 of a high-speed (HS) or HS-auto mode.

7. The non-transitory computer-readable storage medium of claim 1, comprising program code to:

select a frequency slower than the maximum of the first frequencies when the interface-activity parameter indicates that the device does not perform background operations and has not entered an idle state, and a data transmission mode between a host and the device is gear 1 of a high-speed (HS) or HS-auto mode.

8. A method for adjusting operating frequencies, performed by a processing unit of a device when loading and executing software or firmware program code, comprising:

collecting an interface-activity parameter comprising information about data transmissions on a host access interface and/or a flash access interface;

selecting the maximum of a plurality of first frequencies when the interface-activity parameter indicates that the device needs to perform a background operation; and driving a first clock generator to output a first clock signal at the selected first frequency, thereby enabling the host access interface and/or the flash access interface to operate at a first operating frequency, wherein the background operation is a garbage collection, a wear leveling, a read reclaim or a read reflash process.

9. An apparatus for adjusting operating frequencies, comprising:

a first clock generator; and a processing unit coupled to the first clock generator and arranged to operably collect an interface-activity parameter comprising information about data transmissions on a host access interface and/or a flash access interface; select the maximum of a plurality of first frequencies when the interface-activity parameter indicates that the device needs to perform a background operation; and drive a first clock generator to output a first clock signal at the selected first frequency, thereby enabling the host access interface and/or the flash access interface to operate at a first operating frequency, wherein the background operation is a garbage collection, a wear leveling, a read reclaim or a read reflash process.

10. The apparatus of claim 9, comprising:

a second clock generator coupled to the processing unit, wherein the processing unit is arranged to operably select one from a plurality of second frequencies according to the interface-activity parameter; and drive the second clock generator to output a second clock signal at the selected second frequency, thereby enabling the processing unit to operate at a second operating frequency.

11. The apparatus of claim 9, wherein the selected first frequency ranges from 250 MHz to 350 MHz when the interface-activity parameter indicates that the device needs to perform the background operation.

12. The apparatus of claim 9, wherein the processing unit is arranged to operably select the minimum of the first frequencies and the select first frequency ranges from 62.5 MHz to 87.5 MHz when the interface-activity parameter indicates that the device has entered an idle state.

13. The apparatus of claim 9, wherein the processing unit is arranged to operably select the minimum of the first frequencies and the select first frequency ranges from 62.5 MHz to 87.5 MHz when the interface-activity parameter indicates that the device does not perform background operations and has not entered an idle state, and a data transmission mode between a host and the device is Pulse-Width Modulation (PWM) or PWM-auto mode.

14. The apparatus of claim 9, wherein the processing unit is arranged to operably select the maximum of the first frequencies and the select first frequency ranges from 250 MHz to 350 MHz when the interface-activity parameter indicates that the device does not perform background operations and has not entered an idle state, and a data transmission mode between a host and the device is gear 2 or 3 of a high-speed (HS) or HS-auto mode.

15. The apparatus of claim 9, wherein the processing unit is arranged to operably select a frequency lower than the maximum of the first frequencies and the select first frequency ranges from 125 MHz to 175 MHz when the interface-activity parameter indicates that the device does not perform background operations and has not entered an idle state, and a data transmission mode between a host and the device is gear 1 of a high-speed (HS) or HS-auto mode.

* * * * *